United States Patent [19]

Haiges

[11] Patent Number: 4,494,483
[45] Date of Patent: Jan. 22, 1985

[54] CONTAINER FOR THE RECEIVING AND DISPENSING OF ANIMAL REARING AND FEEDING MATERIALS, PARTICULARLY FOR WATERING YOUNG ANIMALS

[75] Inventor: Frank Haiges, Bonnegheim, Fed. Rep. of Germany

[73] Assignee: Suevia Haiges GmbH & Co., Fed. Rep. of Germany

[21] Appl. No.: 563,699

[22] Filed: Dec. 21, 1983

[30] Foreign Application Priority Data

Dec. 15, 1982 [DE] Fed. Rep. of Germany ....... 3248490

[51] Int. Cl.$^3$ .............................................. A01K 7/00
[52] U.S. Cl. .................................................... 119/77
[58] Field of Search .................. 119/77, 51.5, 71, 53.5

[56] References Cited

U.S. PATENT DOCUMENTS

| 555,909 | 3/1896 | Smith | 119/53.5 |
| 3,216,397 | 11/1965 | Pickard | 119/71 |
| 3,730,141 | 5/1973 | Manning et al. | 119/51.5 |

FOREIGN PATENT DOCUMENTS 199102  6/1923  United Kingdom ................. 119/77

Primary Examiner—Hugh R. Chamblee
Attorney, Agent, or Firm—Wigman & Cohen

[57] ABSTRACT

A liquid container has a supply container (12), a watering basin (10) and a shaft (16) connecting the two and having an opening (38) to the basin (10), in order to make possible a work-saving accessibility during refilling. The container opening (at 14) is arranged at the side of the supply container (12) for refilling, and a single hole (13) is arranged off-center on the same side of the supply container (12) as an opening. The supply container (12) has a hinge mount (40) or pin arranged on its back side, so that the container can be pivoted out of the vertical position into the horizontal for refilling, in which horizontal position the container opening (at 14) and the shaft hole (38), which serves as an overflow, are both arranged on top.

11 Claims, 4 Drawing Figures

CONTAINER FOR THE RECEIVING AND DISPENSING OF ANIMAL REARING AND FEEDING MATERIALS, PARTICULARLY FOR WATERING YOUNG ANIMALS

BACKGROUND OF THE INVENTION

The invention relates to a container to receive and dispense animal rearing and feeding materials, and particularly to a watering device for young animals. The device has a watering or trough basin and a vertical shaft which forms the effective rear wall of the basin. A supply container for the material is arranged above the shaft, and is provided with a water and air tight closable opening and communicates with the basin by means of the shaft. The shaft-rear wall of the basin has at least one hole to permit liquid material to pass out of the shaft into the basin.

In known containers of this type, which differ from the container taught in DE-GS No. 8,201,204, a plurality of horizontally arranged drip holes are provided to permit the liquid material to flow from the shaft into the basin. In this arrangement, the container opening, which can be closed by means of a threaded cover, is arranged at the top of the container. When the container opening is closed and the water level in the container basin lies above the drop holes, the closure of the holes prevents the entrance of air into the container shaft through which the air could rise above the water level in the supply container. A container of this type, which acts according to the syphon principle, dispenses water or another, preferably liquid, animal feeding material, to which animal rearing materials can be added, according to need.

With the known containers of the above-mentioned type, the filling of such an empty container is inconvenient, because the container must be taken from its place of use, filled at a tap and returned to its place of use. The temporary closing of the drip holes necessary during filling requires special effort, whether they are held by hand or are sealed by an adhesive strip, which adheres poorly because of the moisture. This is because the drip holes are located at the bottom when the container is being filled through the upper container opening.

SUMMARY AND OBJECTS OF THE INVENTION

The object of the invention, therefore, is to create a container of the above-described type without the related disadvantage, which makes it easier to use.

This object is achieved according to the invention by having the container opening arranged at the side of the supply container, a single hole arranged off-center in the shaft on the same side of the supply container, and the supply container provided with a hinge mount or pin arranged on its back side. Thus the emptied container of the invention can be pivoted by 90° about the hinge axis from the vertical into the horizontal, so that the lateral container opening and the shaft hole lie at the top at approximately the same level. When water is then added through the container opening by means of a hose or a pouring can, the trapped air can escape through the shaft hole until the water level reaches that height. At this moment the container is nearly filled, so that it then only needs to be pivoted back in order to place it in its operational condition. A back and forth transport of the container according to the invention and manipulation thereof are therefore eliminated during filling.

In a preferred exemplary embodiment of the container according to the invention a shaped, punched strap is provided as the hinge mount and is arranged at a point approximately halfway up the vertically disposed container on a back wall of the supply container and/or shaft, so that a simple pivotable mounting of the container is possible by means of a hinge pin anchored to one wall. The preferred exemplary embodiment is distinguished by at least one punched strap to receive a wall connection means. The strap is arranged as far as possible from the hinge point. The wall connection means can be an insert pin which is pulled out of the wall and out of the punched strap before the container is pivoted into the horizontal position, and after the container is pivoted into the horizontal position it is inserted through the strap into the wall, so that before and after the pivoting of the container it arrests the container on the strap. The preparations and wind-up operations for filling, therefore require only a small expense in time and effort.

In the preferred exemplary embodiment an outward wall protrusion is provided as a dosing container for animal rearing materials and is arranged on a side wall of the container opposite the container opening at the same level and depth as the opening. By this means it is possible at the point of use, to measure and mix necessary additives to the drinking water, in that before the filling of the horizontally pivoted container, an appropriate quantity of the additive is sprinkled through the container opening into the dosing container, which is temporarily disposed vertically below the container opening. The dosing container is subsequently filled with water during the filling of the container, whereby the additive is thoroughly mixed with the water. During the subsequent pivoting of the container into the vertical position, the additive spreads throughout the entire water supply.

In a preferred exemplary embodiment, the dosing container consists of at least translucent or, if necessary, transparent plastic and is provided with parallel marking ribs or grooves. This design of the concerned container element simplifies dosing.

In the horizontal arrangement of the container, the shaft hole forms an overflow, through which excess liquid, which in this arrangement is at the upper end of the watering basin, is discharged into said basin, so that the downwardly flowing excess rinses, and thereby cleans, the basin.

To temporarily remove the liquid standing in the watering basin, the container can be pivoted into the horizontal position. The liquid is thereby lost, and during the return pivot into the vertical position cleans the basin, and is thus not uselessly wasted.

In order to simplify the refilling of the container, the container opening is connected by means of a connecting line to a stationary supply line for animal rearing and feeding materials, i.e., generally to a water supply line which may have water provided with additives from a tank.

The connecting line can be provided with a stopcock, in order to be able to refill the containers individually with different water levels when numerous containers are connected to the same supply line.

A hose is effective as a connecting line, because it allows the pivoting of the container without a disadvantageous connection of the container to the supply line.

In a situation where numerous containers according to the invention are to be filled regularly at the same time and the common supply line is formed as a rigid, straight, horizontally arranged tube, it is advantageous to provide each container suspended on the tube so as to rotate therewith. The tube should be capable of rotating over 90° about its longitudinal axis in one direction, which displaces the container opening from the side to the top. As a result, all containers can be pivoted simultaneously out of their ready position into their filling position and vice-versa.

Providing the supply line which may be common to several containers with a stopcock and with an arrestable pilot lever to rotate the supply line, which has a rotatable tube coupling, has the advantage that the servicing of the containers during refilling thereby requires only a few hand grips. The supply line can be provided with a water tight connection to a tube line mounted so as not to rotate.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
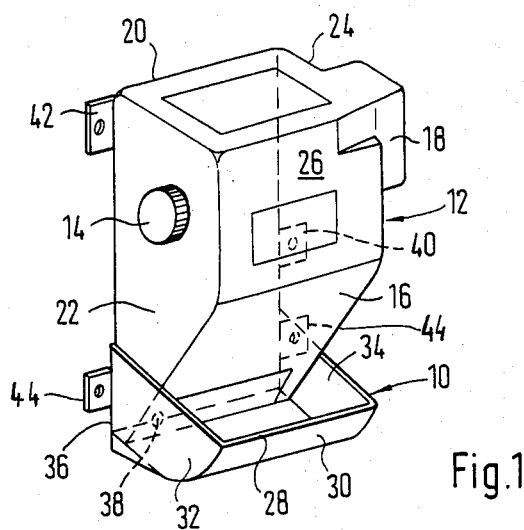
FIG. 1 is a perspective view of the preferred embodiment.

The preferred embodiment consists primarily of a watering basin 10, a supply container 12 with a threaded closure 14, a shaft 16 and a dosing container 18. The closure 14 provides an air and water-tight seal and closes a container opening provided with a threaded support.

The watering basin 10, the supply container 12 and the shaft 16 all have a rectangular, horizontal cross section. Together, the supply container 12 and the shaft 16 form a smooth, vertical rear wall 20. Together, the watering basin 10, the supply container 12 and the shaft 16 form two smooth, vertical side walls 22 and 24, which stand parallel to each other and perpendicular to the rear wall 20. The common front wall 26 of the supply container 12 and the shaft 16 is angled, and the upper portion, i.e. the portion in the area of the supply container, stands parallel to the rear wall 20, and in the lower portion, i.e. in the area of the shaft 16, it stands at an angle to the rear wall, so that the shaft has the shape of a funnel.

The watering basin 10, to which the shaft 16, which is closed at the bottom, engages, can be removed from the shaft. The supply container 12 projects thereover, whereby the edge 28 of the front border 30 of the basin lies in the plane of the vertical portion of the front wall 26. Two smooth, parallel, vertical side walls 32 and 34 and a rear wall 36 of the watering basin 10 perpendicular thereto surround the shaft 16 on three sides. The shaft 16 is provided with a hole 38 on its front side within the basin, which hole is located near the side wall 32 shown at the left in FIG. 1.

In the center of the upper, rectangular element of the side wall 22 of the supply container 12 shown at the left in FIG. 1 is arranged the container opening provided with the threaded closure 14. This container opening lies opposite the center of the dosing container 18 in the horizontal direction parallel to the container rear wall 20. The dosing container 18 is formed by a depression of the side wall 24 of the supply container 12, as shown on the right side of FIG. 1, and has markings formed by the plastic material of the container, which is preferably translucent.

A punched strap 40 is formed on the right side corner, as shown in FIG. 1, at a point halfway up the rear wall 20 of the container. Similarly, a punched strap 42 is formed on the upper left corner of the container wall 20, as shown in FIG. 1, which, like the strap 40, lies in the plane of the rear wall.

In addition, two punched straps 44 are formed at the same level at the sides of the rear wall 36 of the watering basin 10, which serve to provide a separate possible use and attachment for the basin, and are thus not material to the invention. Accordingly, the attachment of the watering basin 10 to the shaft 16 of the container is based on the clamping effect exerted by the side walls 32 and 34 of the shaft on the side walls 22 and 24 of the shaft and the supply container 12.

Figure 2:
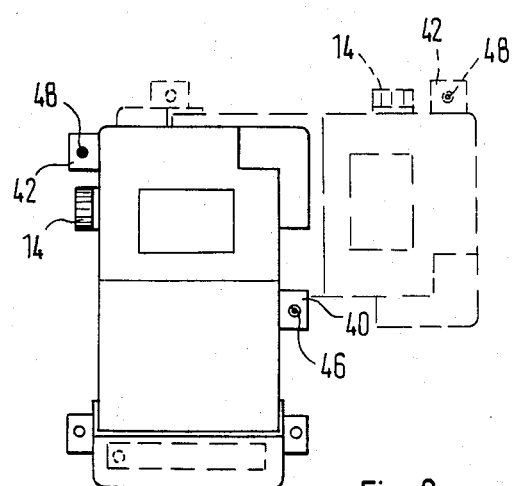
FIG. 2 is a front view of the preferred embodiment in the ready position (solid lines) and, in the filling position (broken lines)

As shown in FIG. 2, the detachable connection of the container in its vertical ready position on an assumedly vertical wall requires a hinge pin 46 and a lock pin 48, which penetrate the straps 40 and 42 and are anchored in the wall or are inserted into a pin receptacle anchored in the wall. An additional pin receptacle is anchored in the wall at a point along a circular arc defined by the anchoring point of the hinge pin 46 as the center point and the hole spacing of the straps 40 and 42 as a radius. After removal of the lock pin 48 and a pivoting of the container in a clock-wise direction about the hinge pin 46, the lock pin 48 can be reinserted into the wall through the strap 42 when the container is in its horizontal filling position. In its filling position illustrated in FIG. 2, the container opening of the container lies at the top, so that the container can be filled after a temporary removal of the threaded closure 14, until the filled water flows through the hole 38 in the container shaft 16. If this occurs for a period of time, then the watering basin 10, which is subject to becoming dirty, will be rinsed thereby and thus cleaned.

Figure 3:
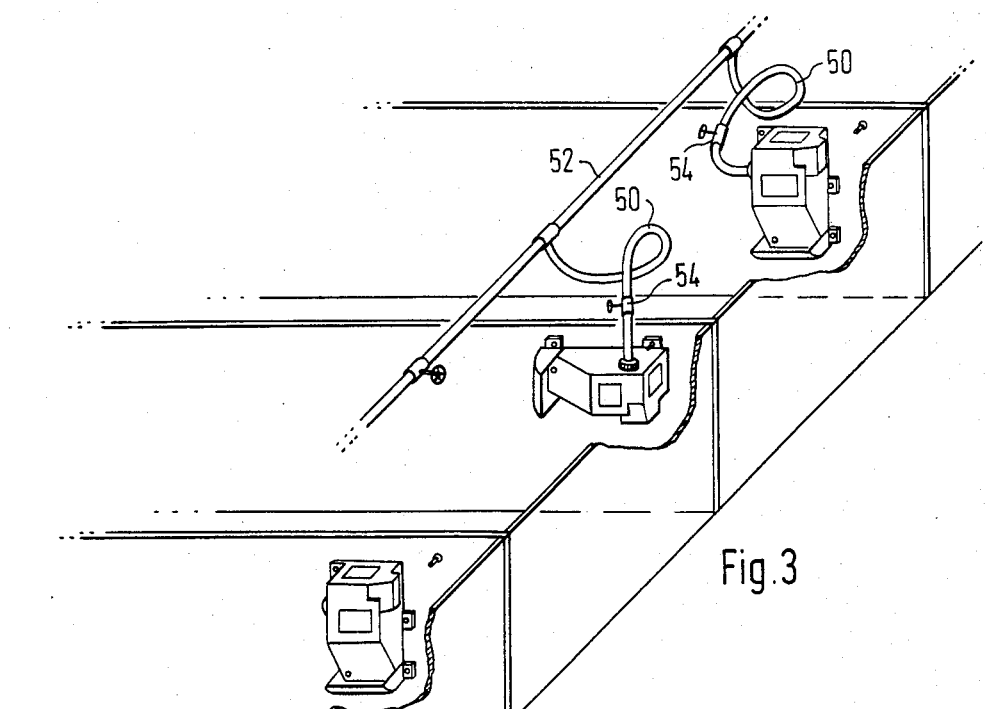
FIG. 3 is a partially cut-away perspective view of a row of animal boxes having connected and unconnected examples of the preferred embodiment in different positions.

FIG. 3 illustrates four identical containers, two of which are in their vertical ready position and two of which are in their horizontal filling position. Of the four containers, two have no connection, while the two remaining containers are each connected by means of a hose 50 as a connecting line between the container and a supply line 52. The two hoses 50 branch off from the supply line 52 and are each provided with a stopcock 54 and, at their ends nearest the containers, with a connection support threaded to the container opening. It will be obvious that the flexible hose 50 does nothing to prevent the pivoting of the container between its ready and its filling positions.

Figure 4:
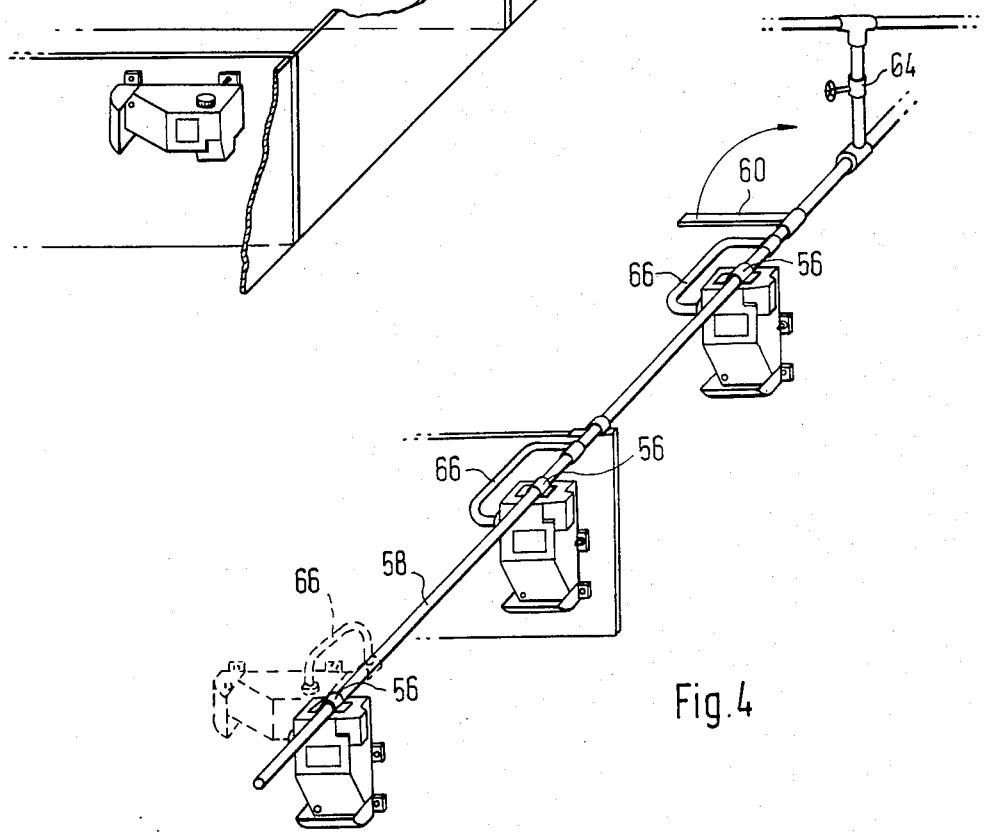
FIG. 4 is a perspective view of three examples of the embodiment with different connections.

In the case of FIG. 4, each of three identical containers is freely suspended by the cover of its supply container and by means of a pipe clamp 56 on a rigid tube 58 so as to rotate therewith. The rigid tube 58 is a supply line and, with the aid of an arrestable pivot lever 60, can be rotated about its straight longitudinal axis. This makes possible a rotational tube coupling 62, to which the tubular element is radially connected. This tubular element is provided with a stopcock 64 which is common to all of the containers. For a simultaneous refilling of the containers, the pivot lever 60 is activated in such a manner that the containers are taken out of their vertical ready position in a clockwise direction into their horizontal filling position, which is indicated for one container in FIG. 4. Since the relative rotational position of the container to the tube 58 is not altered thereby, the connecting lines in the exemplary embodiment are formed as stirrup-shaped, rigid tubular elements 66, one end of which projects into the container opening when the threaded closure 14 is removed, and the other end of which branches off from the tube 58.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A container for receiving and dispensing animal rearing and feeding materials, particularly for the watering of young animals, comprising a watering basin, a vertical shaft which forms an effective rear wall of said basin, and a supply container for the materials, arranged above said shaft, said container being provided with an opening which can be sealed so as to be both water and air tight, and said container communicating with the basin by means of the shaft, wherein said effective rear wall of the basin provided by said shaft has at least one hole to permit liquid material to pass from the shaft into the basin, the container opening being arranged at a side wall of the supply container, said single hole being arranged off-center in the shaft on the same side of the supply container, as said container opening and the supply container being provided with a hinge mount or pin arranged on its back side.

2. The container according to claim 1, wherein a punched strap is provided as the hinge mount, said strap formed on the rear wall of the supply container and at a point halfway up said rear wall.

3. The container according to claim 1, wherein at least one punched strap receives a wall attachment means, which is arranged as far away from the hinge point as possible.

4. The container according to claim 1, wherein the container and the adjoining shaft are made in one piece of a different material than the basin, which can be separated therefrom.

5. The container according to claim 1, further comprising an outwardly extending wall protrusion which forms a dosing container for animal rearing materials on a side wall of the container opposite the container opening and at the same level and depth as the opening.

6. The container according to claim 5, wherein the dosing container is made of plastic which is at least translucent and is provided with parallel marking ribs or grooves.

7. The container according to claim 1, wherein the container opening is connected by means of a connecting line to a stationary supply line for animal rearing and feeding materials.

8. The container according to claim 7, wherein the connecting line is provided with a stopcock.

9. The container according to claim 7, wherein the connecting line is a hose.

10. The container according to claim 7, wherein the supply line is formed as a rigid straight tube and is arranged horizontally, and said container is suspended from the tube so as to rotate together therewith; said tube can be rotated through 90° about its longitudinal axis which causes the container opening to move from the side to the top.

11. The container according to claim 10, wherein the supply line is provided with a stopcock which may be common to several containers having the same supply line and with an arrestable pivot lever to rotate the supply line, which includes a rotatable tube coupling.

* * * * *